United States Patent Office 3,067,896
Patented Dec. 11, 1962

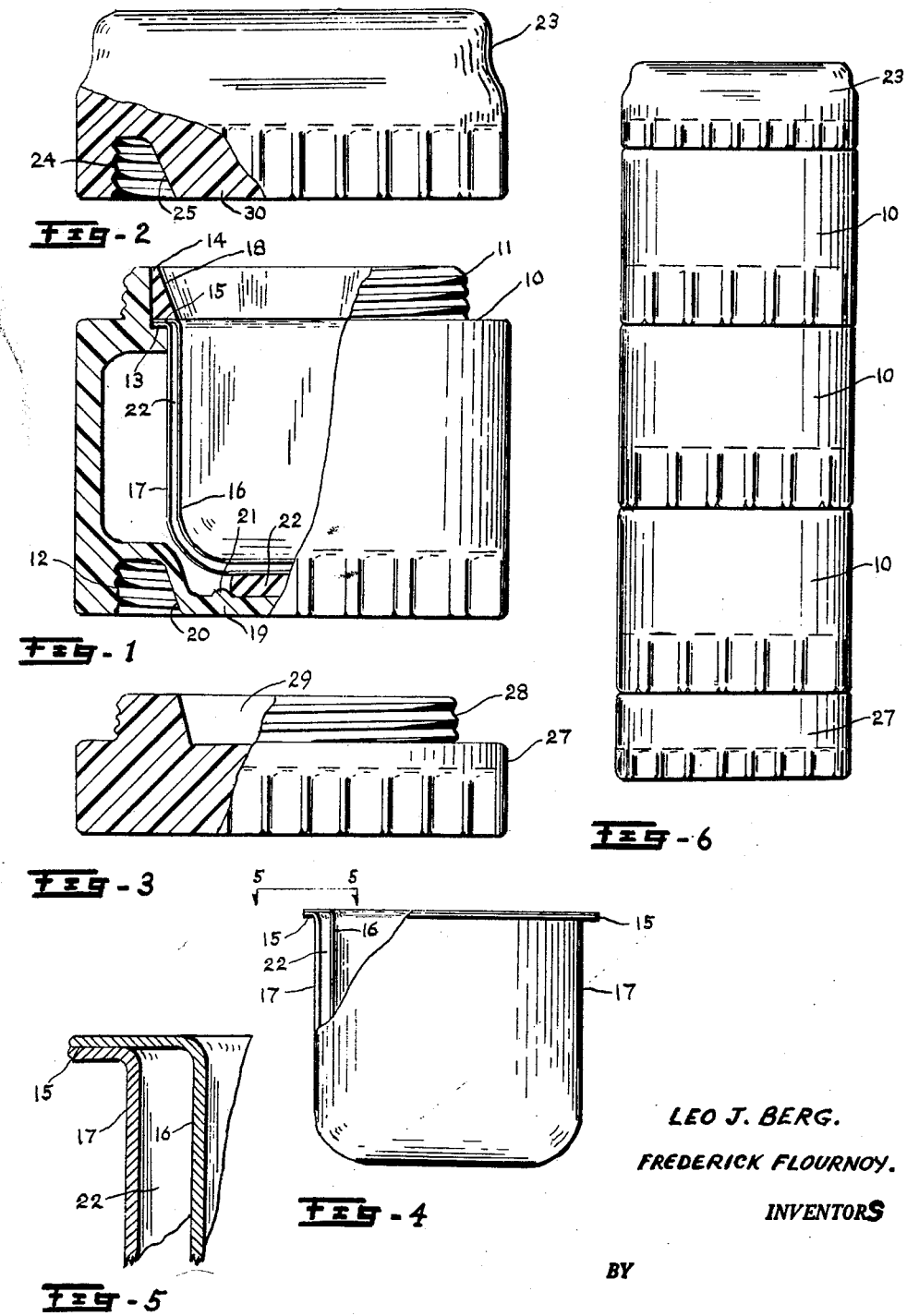

3,067,896
VACUUM BOTTLE
Leo J. Berg, 1670 Leora Lane, Encinitas, Calif., and Frederick Flournoy, 1393 Bonair Drive, Vista, Calif.
Filed Jan. 9, 1962, Ser. No. 165,165
6 Claims. (Cl. 215—13)

This invention relates to vacuum bottles and more particularly to a vacuum food carrrier composed of one or more individual vacuum units which may be mounted piggy-back for carrying a variety of solid or liquid substances.

Heretofore, only individual vacuum bottles and jugs of a fixed capacity have been available, and a person would be restricted as to which hot or cold beverage he could carry, the alternative being to carry several bottles: With the present invention a variety of hot and cold foods and beverages such as soup, coffee or tea, vegetables or other substance that it is desired to maintain at temperatures, may all be carried in one package.

The object of the present invention is to provide a vacuum unit having attaching means at the top and bottom thereof, making it possible to fasten as many units as desired to each other.

A further object is to provide a seal between each unit when they are so attached.

Another object is to provide an unbreakable insulated container unit.

A still further object is to provide an insulating unit that is inexpensive to manufacture and easy to clean when in use.

Another object is to provide a unit having no bottleneck.

These and other novel features of the invention will appear more fully hereinafter from the following detailed description and drawings. It is to be expressly understood, however, that the drawings are employed for the purposes of illustration only, and are not designed as a definition of the limits of the invention, reference being had for this purpose to the appended claims.

In the drawings, wherein similar reference characters refer to similar parts throughout the several views;

FIGURE 1 is a part sectional view of vacuum unit.

FIGURE 2 is a part sectional view of the upper closure cap.

FIGURE 3 shows a part sectional view of bottom protective cap.

FIGURE 4 gives a part sectional view of insulating container unit assembly.

FIGURE 5 is an enlarged section view taken at 5—5 of FIGURE 4.

FIGURE 6 shows a perspective view of an assembly of several units.

Referring first to FIGURE 1, the invention comprises a hollow body member 10 of moulded rigid plastic or similar material, this type of construction being well known in the art, said body member 10, having a male threaded portion 11 and female threaded portion 12 at the respective ends thereof, said male and female threaded portions 11 and 12 being of similar diameter and pitch of thread enabling two or more of aforesaid body members 10 to be brought into association with each other and firmly attached, said body member 10 having the upper inside rim thereof formed to a shoulder 13 for reception of a seal ring 14 of suitable resilient material, the lower and horizontal face of said shoulder 13 being utilized as a seat for rim 15 of insulating cup member 16—17, the aforesaid seal ring 14 having an inward inclined angular slope 18 of approximately twenty degrees from the vertical, said seal ring 14 being of sufficient width at the base thereof to fully cover rim 15 of insulating cup member 16—17 when said cup member is disposed within aforesaid body member 10. Said body member 10, having the bottom face thereof in the form of a tapered plug 19, said plug 19 being of diameter and form to seat within seal ring member 14 of mating body members 10, said plug 19 having an outer angular face 20 with an angle of approximately two degrees greater than aforesaid inward slope 18 of seal ring 14, to put slightly greater pressure on upper face of seal ring 14 and prevent sticking. Aforesaid body member 10 having ribbed inside bottom configuration 21. A cushion 22 of resilient material disposed inside at bottom of body member 10.

Referring to FIGURE 4, the inner insulating cup member in the preferred embodiment utilizes two stainless steel cup members 16—17 disposed one within the other leaving a space 22 between the inner surfaces, said cup members having the upper edges thereof turned outwardly at a right angle to form a rim 15, said rim being sealed by weld or other means and the air evacuated from space 22, said rim 15 being adjusted to diameter to rest on shoulder 13, within body member 10, referring now to FIGURE 2 a cap member 23 having threads 24 within the outer rim thereof to mate with threads 11 on body member 10. Said cap member 23 having the bottom face thereof in the form of a tapered plug 30, said plug 30 being of diameter and form to seat within seal ring 14 of body member 10, said plug member 30 having an outer angular face 25 with an angle of approximately two degrees greater than aforesaid inward slope 18 of seal ring 14; said cap member 23 having suitable configuration on the outer rim thereof to facilitate gripping and turning. Referring to FIGURE 3, a base member 27 having a portion of the body thereof reduced in diameter and threaded 28 to mate with threads 12 on member 10. Said base member 27 having a cavity 29 in the upper face thereof to fit loosely over plug 19 of body member 10 when said base member 27 is screwed in place; said base member 27 having suitable configuration on the outer rim thereof to facilitate gripping and turning.

It will be understood that in using the present invention one body member only could be used together with cap and base members to carry a single substance and keep it hot or cold for several hours as is customary with the well known "Thermos bottle," however, should it be desired to carry at different times various other substances, two or more body units can quickly be attached together with cap and base members to form one package; similarly, should it be desired to carry six containers of hot coffee, this number could be quickly filled and put together as one carrying unit and all will remain hot for several hours: It will also be understood that the invention is not intended to be used for beverages and foods only, there being at times many other substances that it is desirable to keep at temperature for an extended period and for which use some modifications may be necessary.

The foregoing is considered as illustrative only of the principles of the invention. Further numerous modifications and changes will readily occur to those skilled in the art, it is not desired to limit the invention to the exact construction and operation shown and described, and accordingly all suitable modifications and equivalents may be resorted to, falling within the scope of the invention as claimed.

Having thus completely and fully described the invention, what is now claimed as new is as follows.

1. A device of the class described consisting of a cup shaped body member having external screw threads on upper rim and internal screw threads of similar diameter and pitch within the base thereof, an inner cup shaped member of double walled stainless steel disposed within the aforesaid body member, said inner cup having the air evacuated from between the walls thereof, a seal ring of resilient material disposed within the upper rim of the aforesaid body member, said seal ring having an angularly disposed inner face, aforesaid body member having within the bottom face thereof and adjacent to the aforementioned internal threads an angular seat, said angular seat forming a tapered male plug in the base of the aforesaid body member, said male plug dimensioned for seating within sealing ring of identical companion body members, a cap member having internal threads for association with external threads on the aforesaid body member, said cap member having bottom configuration to fit within aforementioned seal ring and thereby effecting a seal, a base member having external threads for association with internal threads on bottom of aforesaid body member, said base member having inside configuration to fit loosely over male plug configuration in base of aforesaid body member.

2. A device of the class described consisting of a cup shaped body member having external screw threads on upper rim and internal screw threads of similar diameter and pitch within the base thereof, an inner cup shaped member of double walled stainless steel disposed within the aforesaid body member, said double walled cup member being composed of two single cup members, said single cup members having the upper edges thereof turned outwardly at right angles to form rims, said single cup members disposed one within the other with rim of inner cup resting on that of outer cup, said rims welded or fastened together by other suitable means and air evacuated from within double walled cup thus formed, a seal ring of resilient material disposed within the upper rim of the aforesaid body member, said seal ring having an angularly disposed inner face, aforesaid body member having within the bottom face thereof and adjacent to the aforementioned internal threads an angular seat, said angular seat forming a tapered male plug in the base of the aforesaid body member, said male plug dimensioned for seating within seal ring of identical companion body members, a cap member having internal threads for association with external threads on the aforesaid body member, said cap member having bottom configuration to fit within aforementioned seal ring and thereby effecting a seal, a base member having external threads for association with internal threads on bottom of aforesaid body member, said base member having inside configuration to fit loosely over male plug configuration in base of aforesaid body member.

3. A device of the class described consisting of a cup shaped body member having external screw threads on upper rim and internal screw threads of similar diameter and pitch within the base thereof, an inner cup shaped member of double walled stainless steel disposed within the aforesaid body member, said double walled cup member being composed of two single cup members, said single cup members having the upper edges thereof turned outwardly at right angles to form rims, said single cup members disposed one within the other with rim of inner cup resting on that of outer cup said rims welded or fastened together by other suitable means and air evacuated from within the double walled cup thus formed, a seal ring of resilient material disposed within the upper rim of the aforesaid body member, said seal ring having an angularly disposed inner face, aforesaid body member having within the bottom face thereof and adjacent to the aforementioned internal threads an angular seat, said angular seat forming a tapered male plug in the base of the aforesaid body member, said male plug dimensioned for seating within seal ring of identical companion body members, said male plug angular bearing surface having an angle of one or more degrees greater than that of the aforesaid seal ring, a cap member having internal threads for association with external threads on the aforesaid body member, said cap member having bottom configuration to fit within aforementioned seal ring and thereby effecting a seal, said bottom configuration angular bearing surface having an angle of one or more degrees greater than that of the aforesaid seal ring, a base member having external threads for association with internal threads on bottom of aforesaid body members, said base member having inside configuration to fit loosely over male plug configuration in base of aforesaid body member, aforesaid cap member and aforesaid base member having an outside surface configuration to facilitate gripping and turning.

4. A device according to claim 3 wherein aforesaid body member is formed having an annular rib at the bottom inside thereof and integral with said body member, a piece of resilient material placed within the boundary of said annular rib, for association with bottom of aforementioned cup member.

5. A device according to claim 4 wherein said double walled cup member is disposed within the aforesaid body member in such manner that the rim of said double walled cup member rests on circumferential ledge within the upper rim of aforesaid body member; said rim of double walled cup member forming a seat for aforementioned seal ring.

6. A device according to claim 4 wherein one or more body members are attached together by their respective ends, the uppermost of said body members having the aforementioned cap member attached thereto, the aforementioned base member being attached to bottom of lowest of said body members.

References Cited in the file of this patent
UNITED STATES PATENTS
2,462,461    Bird _____ Feb. 22, 1949